United States Patent
Danis et al.

(10) Patent No.: US 10,198,382 B2
(45) Date of Patent: Feb. 5, 2019

(54) I2C BUS CONTROLLER SLAVE ADDRESS REGISTER AND COMMAND FIFO BUFFER

(71) Applicant: TEXAS INSTRUMENTS INCORPORATED, Dallas, TX (US)

(72) Inventors: Frederic Danis, La Colle sur Loup (FR); Eric Louis Pierre Badi, Cagnes-sur-Mer (FR)

(73) Assignee: Texas Instruments Incorporated, Dallas, TX (US)

( * ) Notice: Subject to any disclaimer, the term of this patent is extended or adjusted under 35 U.S.C. 154(b) by 87 days.

(21) Appl. No.: 15/091,968

(22) Filed: Apr. 6, 2016

(65) Prior Publication Data

US 2016/0224490 A1    Aug. 4, 2016

Related U.S. Application Data

(62) Division of application No. 13/720,442, filed on Dec. 19, 2012, now Pat. No. 9,336,167.

(30) Foreign Application Priority Data

Dec. 13, 2012 (EP) .................................. 12290440

(51) Int. Cl.
*G06F 13/32* (2006.01)
*G06F 13/364* (2006.01)
(Continued)

(52) U.S. Cl.
CPC .......... *G06F 13/32* (2013.01); *G06F 13/1673* (2013.01); *G06F 13/24* (2013.01);
(Continued)

(58) Field of Classification Search
CPC .......... G06F 13/00; G06F 13/14; G06F 13/16; G06F 13/1642; G06F 13/20; G06F 13/28;
(Continued)

(56) References Cited

U.S. PATENT DOCUMENTS 5,761,516 A  6/1998 Rostoker et al.
6,088,740 A  7/2000 Ghaffari et al.
(Continued)

FOREIGN PATENT DOCUMENTS

CN  1297204 A  5/2001
CN  102124453 A  7/2011

OTHER PUBLICATIONS

"LogiCORE IP AXI IIC Bus Interface". Version 1.01a. DS756. Xilinx, Inc. Jun. 22, 2011.*
(Continued)

*Primary Examiner* — Thomas J Cleary
(74) *Attorney, Agent, or Firm* — Lawrence J. Bassuk; Charles A. Brill; Frank D. Cimino (57) ABSTRACT

Performing transactions on a bus by first generating a sequence of commands by an initiator module and queuing the sequence of commands in a queue module. A first one of the sequence of commands is sent from the queue module via the bus to a target module. The queue module is paused while waiting for a response via the bus from the target module; however, the initiator may continue processing another task. The queue module repeatedly sends a next command via the bus to the target module and waits for a response via the bus from the target module until a last one of the sequence of commands is sent to the target module. The queue module provides only a single acknowledgement to the initiator module after the sequence of commands has been transferred to the target module.

14 Claims, 5 Drawing Sheets

(51) Int. Cl.
*G06F 13/40* (2006.01)
*G06F 13/24* (2006.01)
*G06F 13/16* (2006.01)
*G06F 13/38* (2006.01)
*G06F 13/42* (2006.01)

(52) U.S. Cl.
CPC ............ *G06F 13/364* (2013.01); *G06F 13/38* (2013.01); *G06F 13/404* (2013.01); *G06F 13/4282* (2013.01); *G06F 13/1642* (2013.01)

(58) Field of Classification Search
CPC ...... G06F 13/32; G06F 13/38; G06F 13/4282; G06F 13/364; G06F 13/404; G06F 13/24; G06F 13/1673
See application file for complete search history.

(56) References Cited

U.S. PATENT DOCUMENTS

| | | |
|---|---|---|
| 6,098,121 A | 8/2000 | Furuya |
| 6,363,438 B1 | 3/2002 | Williams et al. |
| 2005/0114556 A1 | 5/2005 | Solomon et al. |
| 2007/0220218 A1 | 9/2007 | Kato |
| 2007/0240011 A1 | 10/2007 | Saripalli et al. |
| 2008/0056124 A1 | 3/2008 | Nanda et al. |
| 2008/0091868 A1 | 4/2008 | Mizrachi et al. |
| 2008/0320191 A1 | 12/2008 | Bravo et al. |
| 2014/0281365 A1 | 9/2014 | Mashey et al. |

OTHER PUBLICATIONS

"SPI/I2C UART with 128-Word FIFOs in WLP". Revision 1. MAX3108. Maxim Integrated Products, Inc. Feb. 2011.*
"TMS320x280x, 2801x, 2804x Inter-Integrated Circuit (I2C) Module". Literature No. SPRU721C. Texas Instruments, Inc. Jun. 2011.*
UM10201 I2C-Bus Specification and User Manual, NXP Semiconductors, Rev 5, Oct. 9, 2012, pp. 1-64.
"UM10204 12C-bus specification and user manual Rev.4", NXT Semiconductors, Feb. 13, 2012, The entire text.
Search Report, Application No. 201310684323.2, dated Aug. 21, 2017.

* cited by examiner

I2C BUS CONTROLLER SLAVE ADDRESS REGISTER AND COMMAND FIFO BUFFER

CLAIM OF PRIORITY UNDER 35 U.S.C. 119(a)

This application is a divisional of prior application Ser. No. 13/720,442, filed on Dec. 19, 2012, now U.S. Pat. No. 9,336,167, issued May 10, 2016;

And claims priority to and incorporates by reference European Patent Application number, 12290440.2 filed Dec. 13, 2012, entitled "Command Queue for Communication Bus."

FIELD OF THE INVENTION

This invention generally relates to systems that use an I2C bus for sending multiple commands from a master device to a slave device.

BACKGROUND OF THE INVENTION

The I2C-bus (inter-integrated circuit) is a de facto world standard that is now implemented in thousands of different ICs manufactured by scores of different companies. Additionally, the versatile I2C-bus is used in various control architectures such as System Management Bus (SMBus), Power Management Bus (PMBus), Intelligent Platform Management Interface (IPMI), Display Data Channel (DDC) and Advanced Telecom Computing Architecture (ATCA).

In consumer electronics, telecommunications and industrial electronics, there are often many similarities between seemingly unrelated designs. For example, nearly every system includes: some intelligent control, usually a single-chip microcontroller; general-purpose circuits like LCD and LED drivers, remote I/O ports, RAM, EEPROM, real-time clocks or A/D and D/A converters; and application-oriented circuits such as digital tuning and signal processing circuits for radio and video systems, temperature sensors, and smart cards.

To exploit these similarities to the benefit of both systems designers and equipment manufacturers, as well as to maximize hardware efficiency and circuit simplicity, Philips Semiconductors (now NXP Semiconductors) developed a simple bidirectional 2-wire bus for efficient inter-IC control. This bus is called the "Inter IC," I2C, or I²C bus. All I2C-bus compatible devices incorporate an on-chip interface which allows them to communicate directly with each other via the I2C-bus. This design concept solves many interfacing problems encountered when designing digital control circuits.

Only two bus lines are required; a serial data line (SDA) and a serial clock line (SCL). Each device connected to the bus is software addressable by a unique address and simple master/slave relationships exist at all times; masters can operate as master-transmitters or as master-receivers. Collision detection and arbitration is supported to prevent data corruption if two or more masters simultaneously initiate data transfer.

Serial, 8-bit oriented, bidirectional data transfers can be made at up to 100 kbit/s in the Standard-mode, up to 400 kbit/s in the Fast-mode, up to 1 Mbit/s in Fast-mode Plus, up to 3.4 Mbit/s in the High-speed mode, or up to 5 Mbit/s in Ultra Fast-mode. On-chip filtering rejects spikes on the bus data line to preserve data integrity. The number of ICs that can be connected to the same bus is limited only by a maximum bus capacitance.

The I2C protocol and operation is described in more detail in available documents; see, e.g. "UM10204 I2C-bus specification and user manual", Rev. 5; 9 Oct. 2012, NXP Semiconductors.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Typically, a microprocessor unit (MPU) microcontroller unit (MCU) may be coupled to an I2C peripheral device that sends I2C commands to other devices within a system. The I2C peripheral device may be configured to send an interrupt request (IRQ) to the host processor to indicate the completion of each command. In a typical prior art system, I2C commands are sent sequentially and require the host to wait for acknowledgements for each command via an IRQ or by polling a status bit, for example.

This behavior is a penalty from the overall system point of view, particularly in intensive read operations because it wastes time and results in IRQ pollution at the host side from IRQs that are issued by I2C peripherals.

For example, in a system with a three axis motion sensor, fifteen IRQs may be needed to read one set of three axis data from one motion. For a simple command, three IRQs may be required. For a three axis sensor, at least five calls (IRQ) may be needed to completely read the sensor data: interrupt status, value on x axis, value on y axis, value on z axis, and control register. Thus, fifteen IRQs may needed to read one set of sensor data; an operation that may happen 100's of times per second.

Such reads may be done in an Intensive manner for an application and result in hundreds of read operation per second. On a complex system on a chip (SOC) system, there may be several modules that are using an I2C interface. An I2C interface allows connecting several peripherals accessed one by one; there is no parallel access. Taking into account a peripheral that must be accessed intensively and the number of peripherals that may be connected on the same bus, the number of IRQs issued by the peripherals to the host increases rapidly and may saturate the CPU's processing capabilities. At the MPU/MCU side, servicing the IRQ can degrade a user experience when the MPU/MCU is running complex tasks.

Embodiments of the invention provide a mechanism to dramatically reduce the number of IRQs generated by an I2C peripheral device, as will be described in more detail below.

The inter-integrated circuit bus ($I^2C$ or I2C) is a multi-master bus. Collision detection and arbitration is supported to prevent data corruption if two or more masters simultaneously initiate data transfer. Each I2C device is recognized by a unique address and can operate as either transmitter or receiver, according to the function of the device. In addition to being a transmitter or receiver, a device connected to the I2C bus can also be considered as master or slave when performing data transfers. Note that a master device is the device which initiates a data transfer on the bus and generates the clock signals to permit that transfer. During this transfer, any device addressed by this master is considered a slave.

The general operation of the I2C protocol will be described herein; however, the I2C protocol and operation is described in more detail in publically available documents; see, e.g. "UM10204 I2C-bus specification and user manual", Rev. 5; 9 Oct. 2012, NXP Semiconductors, which is incorporated by reference herein.

Figure 1:
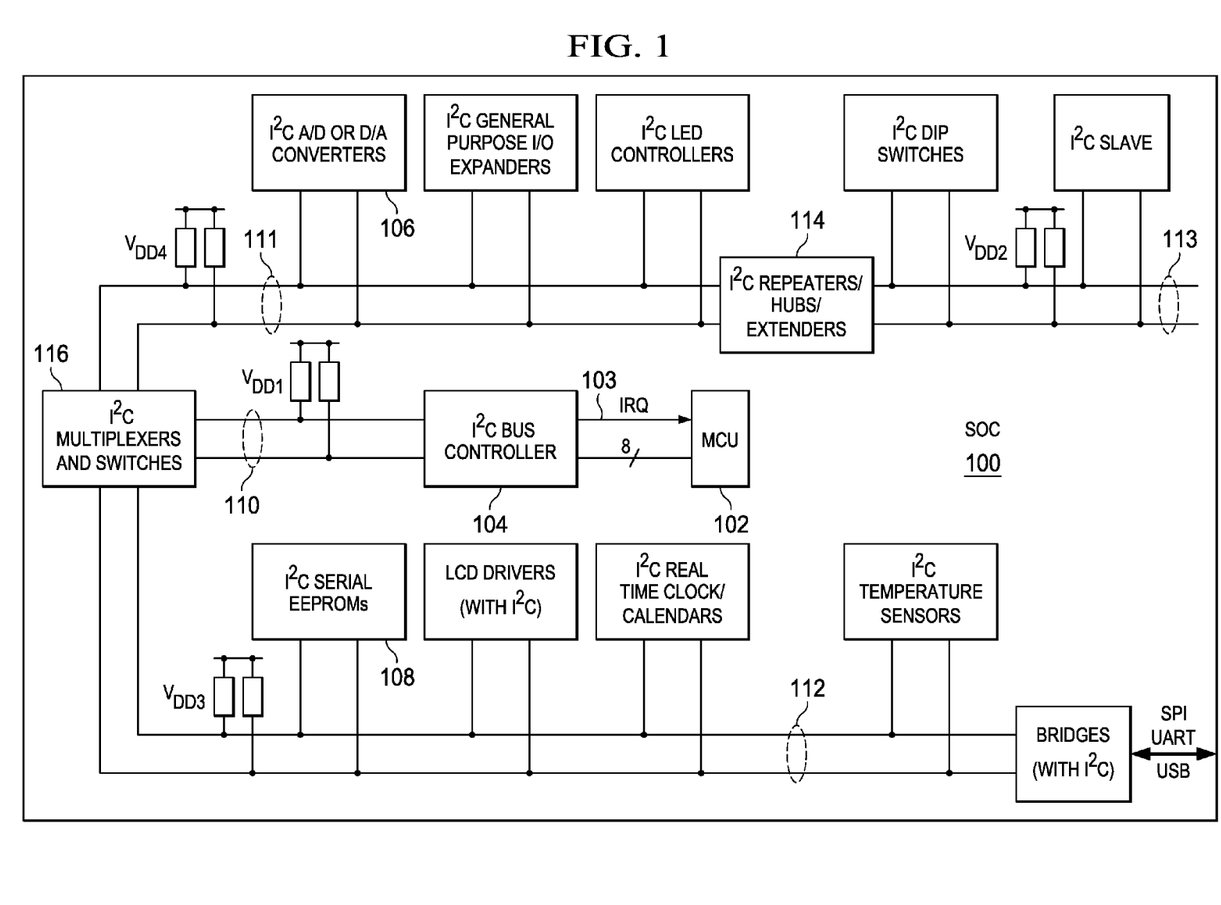
FIG. 1 is a block diagram of an example system that includes an I2C peripheral device configured to eliminate a significant percentage of interrupt requests.

FIG. 1 is a block diagram of an example system 100 that includes an I2C peripheral device 104 that is configured to eliminate a significant percentage of interrupt requests 103 sent to MCU 102. In this example, system 100 is a system on a chip (SoC) that includes one or more microcontroller units 102, and one or more peripheral devices, such as analog to digital or digital to analog converters 106, general purpose I/O (input/output) expanders, LED (light emitting diode) controllers, switches, LCD (liquid crystal display) driver, real time clock, temperature sensors, etc. One or more memory devices, such as EEPROM (electrically erasable programmable read only memory) 108 may be coupled to MCU 102 by a serial connection via the I2C bus.

I2C peripheral 104 provides an interface between a local host (LH) 102 such as an ARM, MIPS, or DSP (digital signal processor) processor and any I2C-bus-compatible device that connects via the I2C serial bus. In this example, the I2C bus is divided into several segments, such as I2C buses 110-113, by repeater 114 and multiplexor 116. Each I2C segment may operate using a different pull-up voltage $V_{DD}$ depending on the technology used by the devices connected to a given segment. External components attached to the I2C bus can serially transmit/receive up to 8-bit data to/from the LH device through the two-wire I2C interface.

Figure 2:
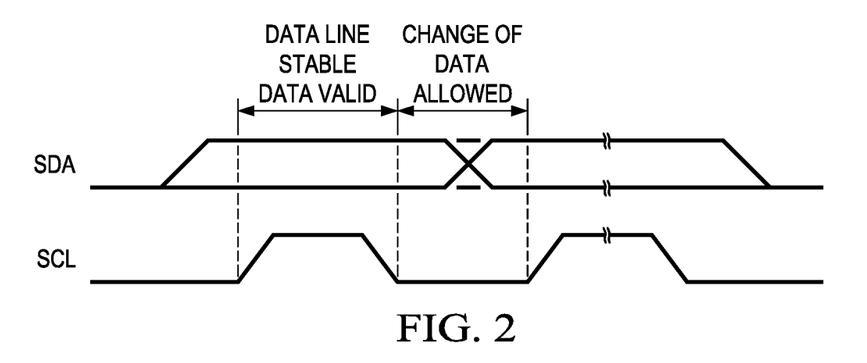
FIGS. 2-4 are signal diagrams illustrating operation of an I2C bus.
Figure 3:
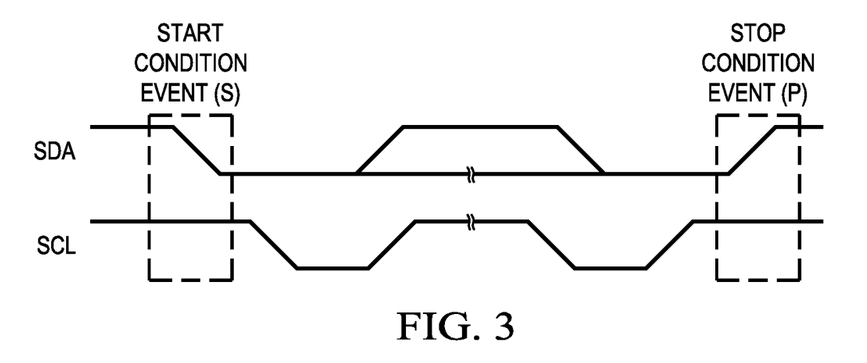
Figure 4:
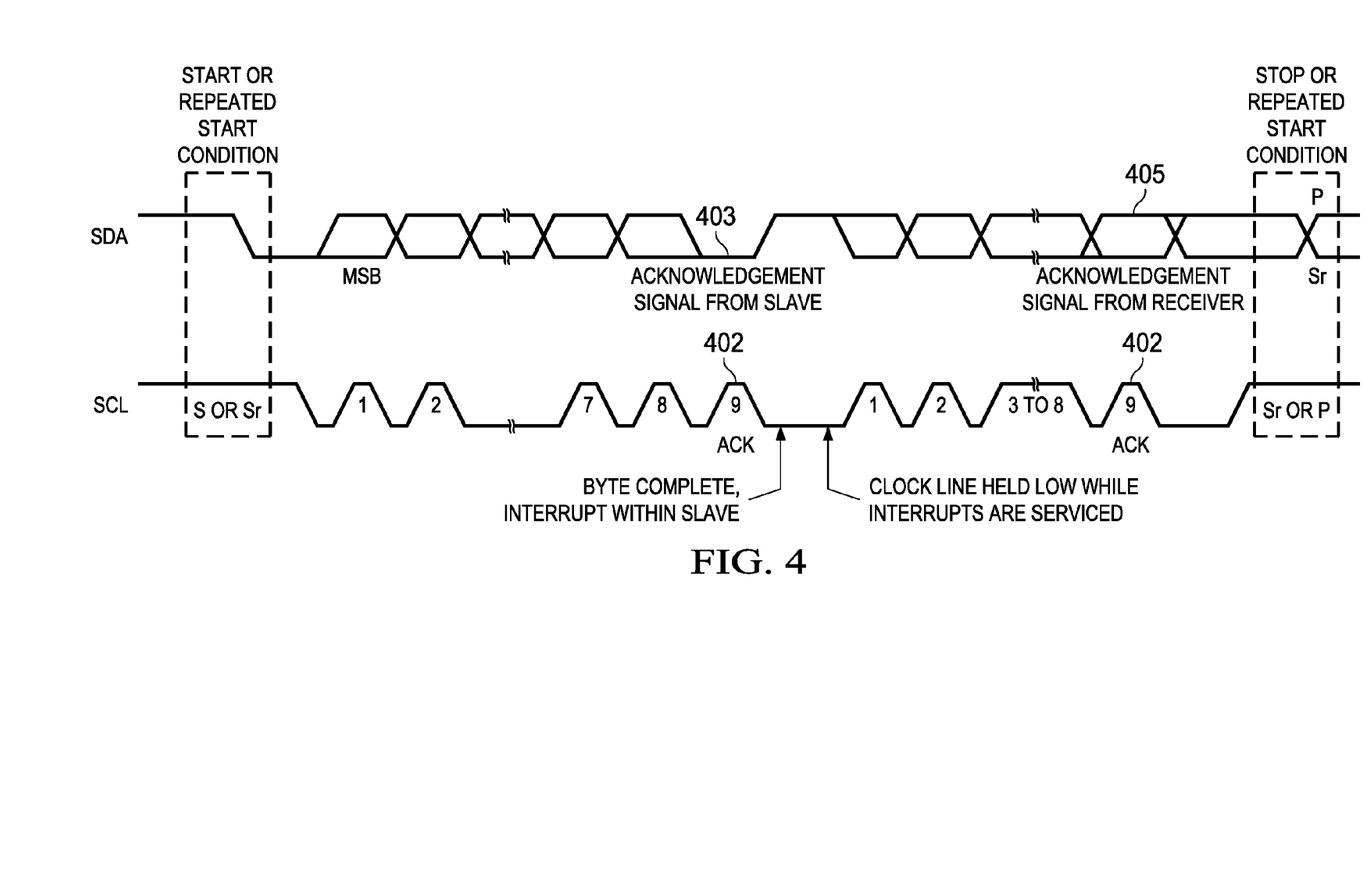

FIGS. 2-4 are signal diagrams illustrating operation of an I2C bus. Referring to FIG. 2, two wires, serial data (SDA) and serial clock (SCL) carry information between the devices connected to the bus. Each device is recognized by a unique address (whether it is a microcontroller, LCD driver, memory, keyboard interface, etc) and can operate as either a transmitter or receiver, depending on the function of the device. An LCD driver may be only a receiver, whereas a memory can both receive and transmit data. In addition to transmitters and receivers, devices can also be considered as masters or slaves when performing data transfers. A master is the device which initiates a data transfer on the bus and generates the clock signals to permit that transfer. At that time, any device addressed is considered a slave.

The I2C-bus is a multi-master bus. This means that more than one device capable of controlling the bus can be connected to it. As masters are usually microcontrollers, a typical transfer might be between MCU 102 and ADC 106 connected to the I2C-bus. Both SDA and SCL are bidirectional lines, connected to a positive supply voltage via a current-source or pull-up resistor (see FIG. 1). When the bus is free, both lines are HIGH. The output stages of devices connected to the bus must have an open-drain or open-collector to perform a wired-AND function. Data on the I2C-bus can be transferred at rates of up to 100 kbit/s in the Standard-mode, up to 400 kbit/s in the Fast-mode, up to 1 Mbit/s in Fast-mode Plus, or up to 3.4 Mbit/s in the High-speed mode. The bus capacitance limits the number of interfaces connected to the bus.

Referring to FIG. 2, the data on the SDA line must be stable during the high period of the clock. The high and low states of the data line can only change when the clock signal on the SCL line is LOW.

Referring to FIG. 3, all transactions begin with a START (S) and are terminated by a STOP (P). A HIGH to LOW transition on the SDA line while SCL is HIGH defines a START condition. A LOW to HIGH transition on the SDA line while SCL is HIGH defines a STOP condition. I2C module 104 generates START and STOP conditions when it is configured as a master. The bus is considered to be busy after the START condition and free after the STOP condition.

Referring to FIG. 4, Acknowledge (ACK) and Not Acknowledge (NACK) is used to control data flow. An acknowledge takes place after every byte. The acknowledge bit allows the receiver to signal the transmitter that the byte was successfully received and another byte may be sent. The master generates all clock pulses, including a ninth clock pulse 402 for an acknowledgment response from a slave.

The transmitter releases the SDA line during the acknowledge clock pulse 402 so the receiver can pull the SDA line LOW and it remains stable LOW during the HIGH period of this clock pulse, as illustrated at 403. When SDA remains HIGH during this ninth clock pulse, this is defined as the Not Acknowledge signal, as illustrated at 405. The master can then generate either a STOP condition to abort the transfer, or a repeated START condition to start a new transfer. There are five conditions that lead to the generation of a NACK:
1. no receiver is present on the bus with the transmitted address so there is no device to respond with an acknowledge;
2. the receiver is unable to receive or transmit because it is performing some real-time function and is not ready to start communication with the master;
3. during the transfer, the receiver gets data or commands that it does not understand;
4. during the transfer, the receiver cannot receive any more data bytes; and
5. a master-receiver must signal the end of the transfer to the slave transmitter.

I2C bus transactions operate in 8-bit word data format (byte write access supported for the last access). Each byte put on the SDA line is 8 bits long. The number of bytes that can be transmitted or received is not restricted. The data is transferred with the most significant bit (MSB) first. Each byte is followed by an acknowledge bit from the I2C module if it is in receiver mode.

The I2C module 104 supports two data formats: 7-bit/10-bit addressing format; and 7-bit/10-bit addressing format with repeated start condition. The first byte after a start condition (S) always consists of 8 bits. In the acknowledge mode, an extra bit dedicated for acknowledgement is inserted after each byte.

In the addressing formats with 7-bit addresses, the first byte is composed of 7 MSB slave address bits and 1 LSB (least significant bit) R/W (read/write) bit. In the addressing formats with 10-bit addresses, the first seven bits of the first byte are the combination 1111 0XX of which the last two bits (XX) are the two most-significant bits (MSB) of the 10-bit address; the eighth bit of the first byte is the R/W bit that determines the direction of the message.

Figure 5:
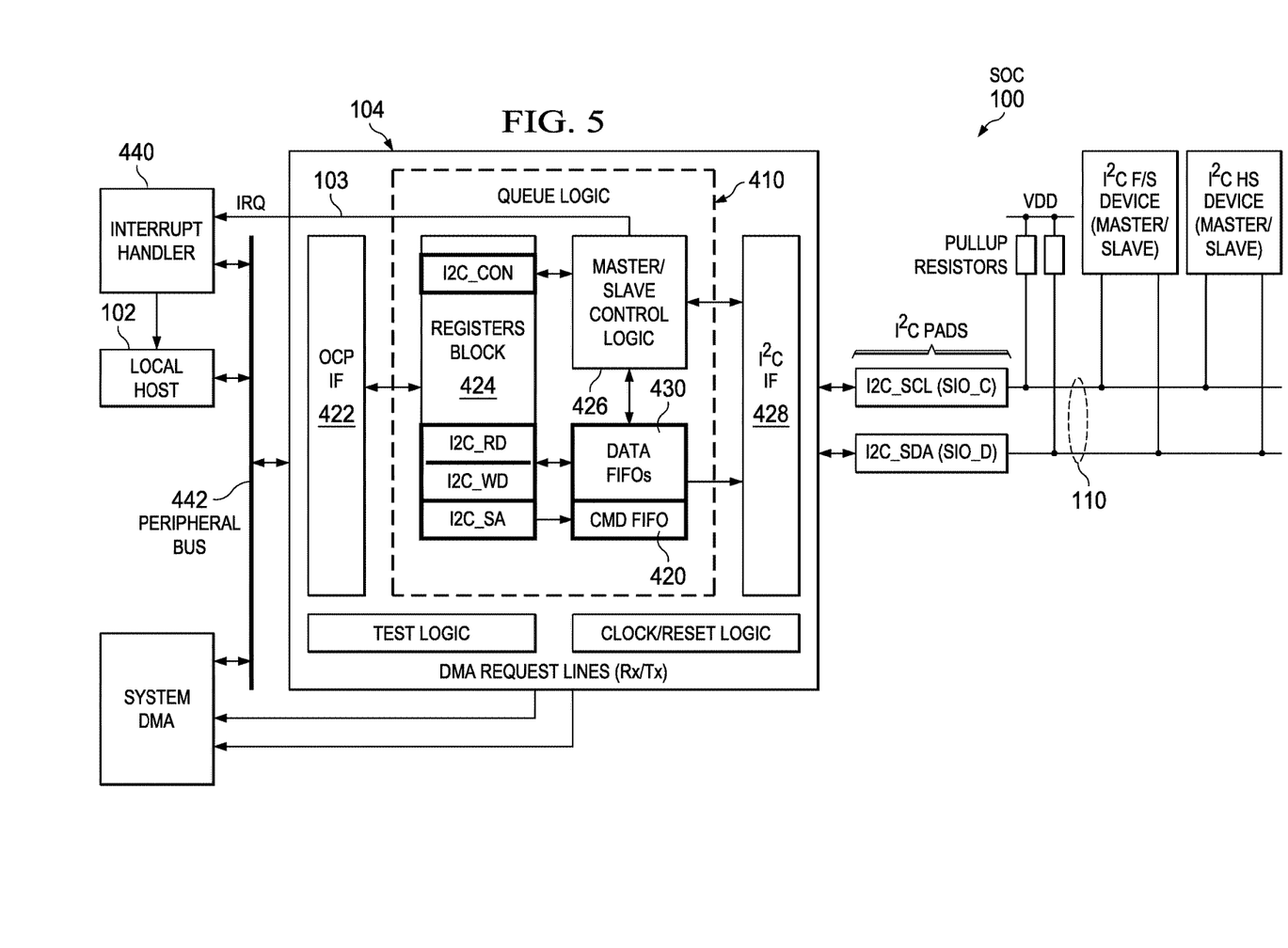
FIG. 5 is a more detailed block diagram of the system of FIG. 1.

FIG. 5 is a more detailed block diagram of the system of FIG. 1, illustrating I2C controller 104 in more detail. I2C controller 104 includes queue logic module 410 that is used to minimize the number of times the IRQ signal 103 is asserted to interrupt control logic 440 that is coupled to local host 102. Interrupt control logic 440 may be integral to local host 102 in some embodiments or may be separate in others, as illustrated here. Interrupt logic 440 may receive several different interrupt request signals and cause local host 102 to begin executing a different interrupt service routine in response to each interrupt request signal, as in well known. LU 102 is interfaced to I2L controller 104 via on-chip protocol (OCP) interface logic 422. In this embodiment, OCP interface logic 422 is configured to connect to a sixteen bit parallel peripheral bus 442 for coupling to LH 102.

Queue logic module 410 includes register block 424, master/slave control logic 426, command FIFO (first in first out) buffer 420, read and write data FIFOs 430.

Register block 424 contains various control, status and data registers that may be accessed by LH 102 via OCP logic 422.

Master/slave control logic 426 responds to various control registers in register block 424 that may be loaded by LH 102 and provides status information to status registers in register block 424 that may then be accessed by LH 102.

Command FIFO 420 is coupled to address slave register I2C_SA in register block 424 and each slave address command written to the I2C-SA by LH 102 is accumulated in command FIFO 420. Similarly, write data FIFO 430 accumulates write data loaded into write data register I2C_WD by LH 102. Read data FIFO 430 similarly receives and accumulates read data from I2C IF logic that may be accessed by LH 102 via the read data register I2C_RD.

For a single I2C command transfer, a slave address is written to the I2C serial address (I2C_SA) register by LH 102. A start bit (STT) is then written into I2C control (I2C_CON) register by LH 102. Master/slave logic 426 then directs I2C interface logic 428 to begin a data transfer on I2C bus 110, using the I2C protocol described above in more detail. The data transfer between the I2C IF logic and the addressed slave may be either a read or a write as defined by the R/W bit of the slave address, as described above.

Figure 6:
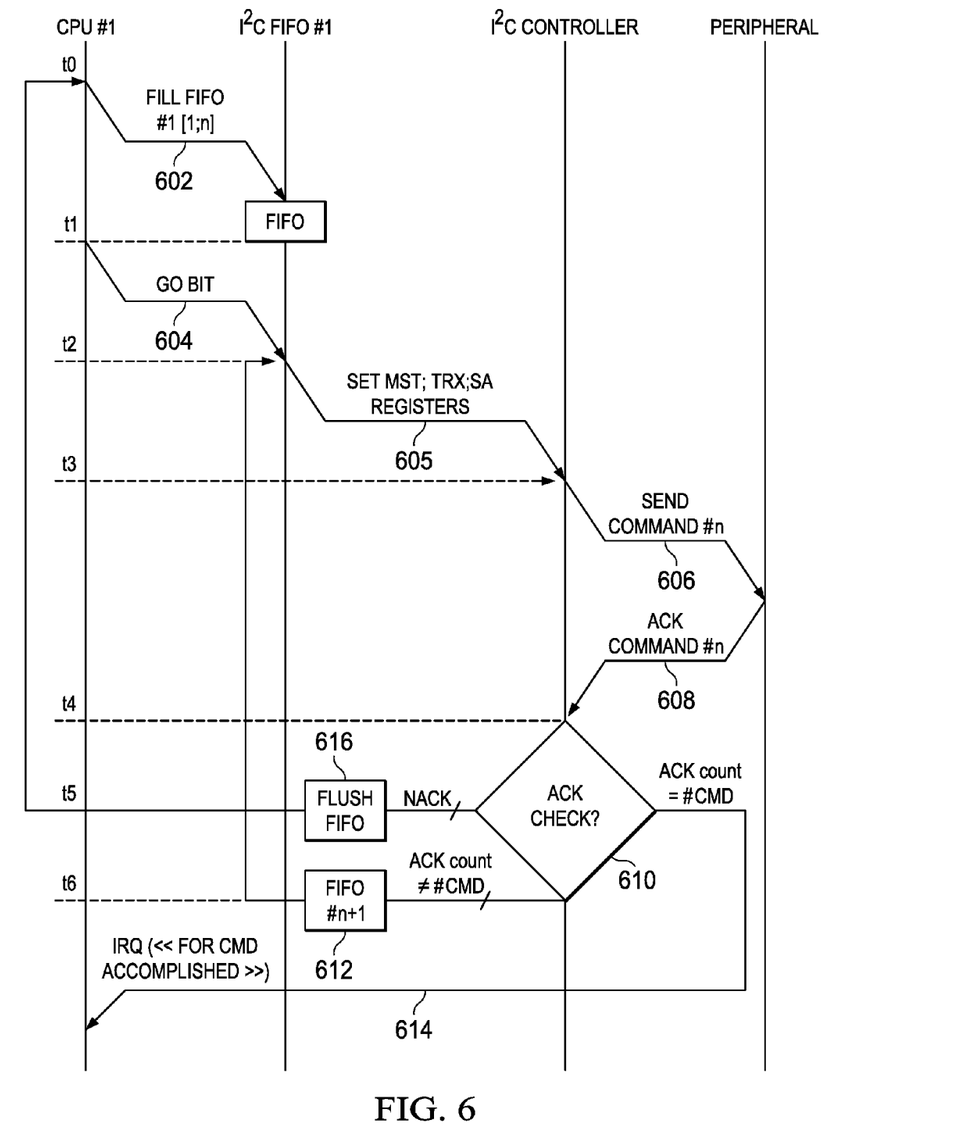
FIGS. 6 is a flow diagram illustrating operation of an I2C peripheral device configured to eliminate a significant percentage of interrupts requests.

FIG. 6 is a ladder diagram illustrating operation of FIFO command mode. FIFO Command Mode is a special mode, useful by certain applications, where software optimization is obtained by minimizing the interactions between local host 102 and I2C module 104 during a specific sequence of data transfers. It can be applied only in Master Mode, for both transmit and receive modes, for both High Speed and F/S (fast or standard speed).

FIFO command mode is entered in response to receiving 602 a sequence of more than one slave address writes to the I2C_SA register from LH 102 before LH 102 starts one specific transfer by setting 604 the STT bit in the I2C_CON register at time t1. The I2C_SA register is coupled to command FIFO 420. In this embodiment, command FIFO 420 is five entries deep allowing a maximum five slave addresses to be recorded. Therefore the number of command writes in a buffered command sequence can be two, three, four, or five. A FIFO pointer keeps track of how many slave addresses are loaded into command FIFO 420. When the STT bit is set, the current value of the FIFO pointer is saved in a command count (#CMD) register, and then the FIFO pointer is set to "000" to again point to the first command. In this embodiment, the maximum value can be "100" when five slave address were loaded via the I2C_SA register.

In this embodiment, I2C_DATA FIFO's 430 can be of depth 8, 16, 32, or 64, according to a FIFODEPTH parameter that is stored in register block 424.

Writes to the I2C_SA address are not allowed after the STT (start) bit is set in the I2C control (I2C_CON) register before completing all programmed transfers. In this embodiment, if I2C_SA address register is written to during a buffered command sequence transfer, the addresses added will be ignored, and the transfer will continue uninterrupted for the original set of addresses recorded before setting STT. Other embodiments may handle this situation differently, such as by flagging an error.

When Transmit Mode is selected in response to the R/W bit of a slave address, the corresponding write data needs to be written to the I2C_DATA register and thereby loaded into write data FIFO 430 prior to setting the STT bit.

After the STT bit is asserted, control logic 426 sets 605 the master/slave transfer mode (MST) register, the transmit/receive mode (TRX) register, and the slave address (SA) registers in the I2C_IF logic 428. I2C_IF 428 then starts 606 the first slave transfer at time t3, using the standard I2C protocol described above with regard to FIGS. 2-4.

The first slave address to be addressed when the data transfer starts in FIFO command mode is the first one sent, at the FIFO pointer value "000". The corresponding data byte is also the first one registered in the DATA register, for the Transmit Mode, or the first one received from the I2C slave, for the Receive Mode.

At the completion of the first I2C transfer, the peripheral responds 608 with an ACK/NACK, as described above, that is received by the I2C interface logic at time t4. A check is done 610 to determine if the ACK count is equal to the number of commands in the command FIFO as indicated by the #CMD register. If the ACK count is not equal to the number of commands, then the FIFO pointer is incremented 612 and the next slave address is sent to the peripheral without sending an interrupt to host processor 102.

This sequence is repeated until the ACK count becomes equal to the number of commands in this sequence. An interrupt request is then sent 614 to interrupt handler logic 440 for LH 102. The data transfer for the up to five slave addresses happens with no interrupts signaled to the Host, until the data transfer for the last address is done. The exit from this mode happens with an ARDY interrupt for the TX mode, or RRDY interrupt for the RX mode.

During FIFO command mode, the transfer is done with repeated start on the I2C-bus. At the start of each transfer, the internal slave address register in I2C IF logic 428 is updated with a value stored in the command FIFO 420 via the I2C_SA register, starting from the one with pointer "000" up to maximum "100". For each slave address, the STT bit in the I2C_CON register is set by hardware for a transfer with repeated start. After sending each byte, the slave address is changed to the next one.

Registers-ready-for-access interrupt (ARDY) is generated by the control logic 426 after a write command sequence when the previously programmed sequence of address, data, and command have been performed and the status bits have been updated. This interrupt is used to let the LH 102 know that the I2C registers are ready for access.

Receive interrupt/status (RRDY) is generated after a read command sequence when there is received data ready to be read by the LH from the I2C_RD register. LH 102 can alternatively poll this bit to read the received data from the I2C_DATA register.

A No-acknowledge interrupt (NACK) is generated when the master I2C does not receive acknowledge from the receiver.

Additional interrupts may be generated for other operating modes of I2C controller 104. Other embodiments may generate different types or combinations of interrupt signals. For example, a single interrupt signal could be augmented by reading a status register to determine a cause for the interrupt.

The current status during a FIFO Command Mode is given in a dedicated register I2C_C2_CON in register block 424, which provides the following status information: FIFO Mode, FIFO LEVEL, and OVERFLOW. The FIFO_MODE is asserted as soon the STT bit is set in the I2C_CON register while having more than one address into the I2C_SA address register, and it is de-asserted when the last address in the I2C_SA address FIFO is completed and a stop is sent on the I2C-bus.

The FIFO_LEVEL has values from "000" to "100" showing at each moment the pointer of the address in the I2C_SA address file being served at a certain moment. Before entering the FIFO Command Mode, or after completing this mode, the value changes to "000". In this embodiment, the maximum value can be "100" when five locations in the I2C_SA address register were given.

The OVERFLOW bit is asserted when more than five addresses are being sent to the I2C_SA register, before setting the STT bit in the I2C_CON register. The overflow asserts the AERR interrupt (bit-field 7 in the I2C_IRQSTATUS register), which can also be set by possible overflow on the I2C_DATA register, from the OCP side. As soon the AERR bit status is cleared, in the I2C_IRQSTATUS, also the OVERFLOW status bit in the I2C_C2_CON register is cleared. When overflow occurs, the new slave address is ignored and the SA FIFO pointer remains unchanged.

In a special situation, where a NACK, or AL (arbitration lost) is encountered, the loop will be broken; FIFO mode is exited as soon one of these bits is set. When NACK or AL happens, pointers for address FIFO (I2C_SA) 420 and data FIFO's (I2C_DATA) 430 are reset by hardware to flush 616 the FIFOs.

In this embodiment, the FIFO Command Mode is not supported for transfers with DMA (direct memory access) enabled. For such situations, even if the I2C_SA FIFO has more than one address being stored, when STT bit is set in the I2C_CON register, the FIFO Command Mode is prevented from being entered. While this embodiment of I2C controller 104 supports DMA operation, DMA will not be described in further detail herein.

After the transfer is complete in the FIFO Command Mode, the address pointer resets automatically, by hardware, to "000". This also happens when the FIFO Command Mode is being interrupted by a NACK or AL interrupts.

In this manner, the usage of the start bit on each I2C bus transaction allows backward compatibility with any I2C peripheral device and with software that may be executed by host processor 102. There is no need for an extra register to enable the FIFO mode. The Start bit can be triggered either when a single command is to be processed (legacy mode) or when a sequence of commands are queued, as described herein.

FIFO command mode allows executing a sequence of commands from a master atomically with a final IRQ that notifies the system that the bus is free for another master. FIFO command mode allows a software control application executed on LH 102 to perform better and may be easier to write. For example, in a system that requires intensive reading or writing to an I2C peripheral, at least 90% of IRQs may be eliminated.

For example, in a system in which the read recurrence period is ~8 ms, a legacy system would produce 750 IRQ per second for eight bit data and 1125 IRQ per second for sixteen bit data. By using FIFO command mode, the IRQ rate will drop to 125 IRQ per second for either eight bit or sixteen bits data.

In some embodiments, read commands and write commands may both be interleaved in a FIFO sequence.

System Examples

Referring again to FIG. 1, digital system 100 includes a processor 102 and associated memory for holding software instructions for execution by processor 102, a non-volatile storage device 108 that may hold software instructions and data, and numerous other elements and functionalities typical of digital systems (not shown). In one or more embodiments of the invention, a digital system may include multiple processors. SoC 100 may also be coupled to input means, such as a keyboard, keypad, switches, environmental sensors such as temperature, pressure, motion, acceleration, etc. SoC 100 may be coupled to output means, such as a monitor, LCD panel, LEDs or other display device(s), motion actuators, relays, etc. Those skilled in the art will appreciate that the input and output means may take other forms.

SoC 100 may be connected to a network (not shown) (e.g., a local area network (LAN), a wide area network (WAN) such as the Internet, a cellular network, any other similar type of network and/or any combination thereof) via a network interface connection (not shown). SoC 100 may include functionality to receive or transmit data via the network interface connection, to or from the storage device 108, for example Other Embodiments While the invention has been described with reference to illustrative embodiments, this description is not intended to be construed in a limiting sense. Various other embodiments of the invention will be apparent to persons skilled in the art upon reference to this description. For example, the I2C bus may be a single segment, or it may be divided into multiple segments by repeaters, bridges, splitters, multiplexors, etc. An embodiment may have a single master or multiple masters on a common I2C bus. The I2C bus may be confined to devices on a single SoC substrate, or may be coupled to devices on multiple integrated circuits mounted on a rigid or flexible printed circuit board or other type substrate, or may be coupled to devices on multiple integrated circuits that are packaged in a multiple chip module (MCM), or stacked in a System in a Package (SiP), etc.

While the command and data queues were described herein as FIFOs, other embodiments may use different queue structures, such as last in first out (LIFO), first in last out (FILO), round robin, etc. While a queue depth of five commands was described herein, other embodiments may have queue lengths that may be longer or shorter than five.

While embodiments based on the I2C bus are described herein, other embodiments may be based on a different bus protocol while still aggregating multiple single bus transactions to thereby reduce the number of times a host processor must be interrupted to deal with the data transmitted or received on the bus.

Embodiments of the systems and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the bus transactions. Analog-to-digital converters and digital-to-analog converters provide coupling to the real world, modulators and demodulators (plus antennas for air interfaces) can provide coupling for waveform reception of data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. An integrated circuit I2C controller comprising:
   protocol logic having a peripheral bus interface and a queue logic interface;
   I2C logic having a queue logic interface and an I2C bus interface;
   queue logic having a protocol logic interface coupled to the protocol logic and an I2C interface coupled to the I2C queue logic interface, the queue logic including:
      a register block coupled to the protocol logic, the register block including a control register with a start bit position, a read data register, a write data register, and a slave address register having inputs coupled to the protocol logic and having outputs;
      master/slave control logic coupled to the register block and to the I2C logic and having an interrupt signal output;
      a command FIFO buffer having inputs coupled to the outputs of the slave address register and outputs coupled to the I2C logic, the command FIFO buffer including plural address registers to accumulate plural addresses from the slave address register at the same time; and
      read and write data FIFO buffers coupled to the read data register, to the write data register, to the master/slave control logic, to the command FIFO buffer, and to the I2C logic; and
      the master/slave control logic sending an interrupt signal on the interrupt signal output only after sending all of the I2C bus slave data to all of the I2C bus slave addresses.

2. The I2C controller of claim 1 in which the command FIFO buffer has five address registers.

3. The I2C controller of claim 1 including a peripheral bus coupled to the peripheral bus interface.

4. The I2C controller of claim 1 including a peripheral bus coupled to the peripheral bus interface and a local host coupled to the peripheral bus.

5. The I2C controller of claim 1 including an I2C master/slave device coupled to the I2C interface.

6. The I2C controller of claim 1 including an I2C multiplexer coupled to the I2C interface.

7. The I2C controller of claim 1 including an I2C A/D converter coupled to the I2C interface.

8. The I2C controller of claim 1 including an I2C repeater coupled to the I2C interface.

9. The I2C controller of claim 1 including an I2C bridge coupled to the I2C interface.

10. An integrated circuit bus interface controller comprising:
    protocol logic having a peripheral bus interface and a first queue logic interface;
    bus interface logic having a second queue logic interface and a bus interface, the bus interface having a bidirectional data line and a bidirectional clock line;
    queue logic having a protocol interface coupled to the first queue logic interface and a bus logic interface coupled to the second queue logic interface, the queue logic including:
       a register block coupled to the protocol interface, the register block including a control register with a start bit position, a read data register, a write data register, and a slave address register;

master/slave control logic coupled to the register block and to the bus logic interface and having an interrupt signal output;

a command FIFO buffer coupled to the slave address register and coupled to the bus logic interface, the command FIFO buffer including plural address registers to accumulate plural addresses from the slave address register at the same time; and read and write data FIFO buffers coupled to the read data register, to the write data register, to the master/slave control logic, and to the bus logic interface; and the master/slave control logic sending an interrupt signal on the interrupt signal output only after sending all of the I2C bus slave data to all of the I2C bus slave addresses.

11. The bus interface controller of claim 10 in which the command FIFO buffer has five address registers.

12. The bus interface controller of claim 10 including a multiplexer coupled to the bus interface.

13. The bus interface controller of claim 10 including a bridge coupled to the bus interface.

14. The bus interface controller of claim 10 including a peripheral bus coupled to the peripheral bus interface and a local host coupled to the peripheral bus.

* * * * *